Aug. 16, 1938. E. A. CORBIN, JR 2,126,739
VALVE
Filed March 30, 1937
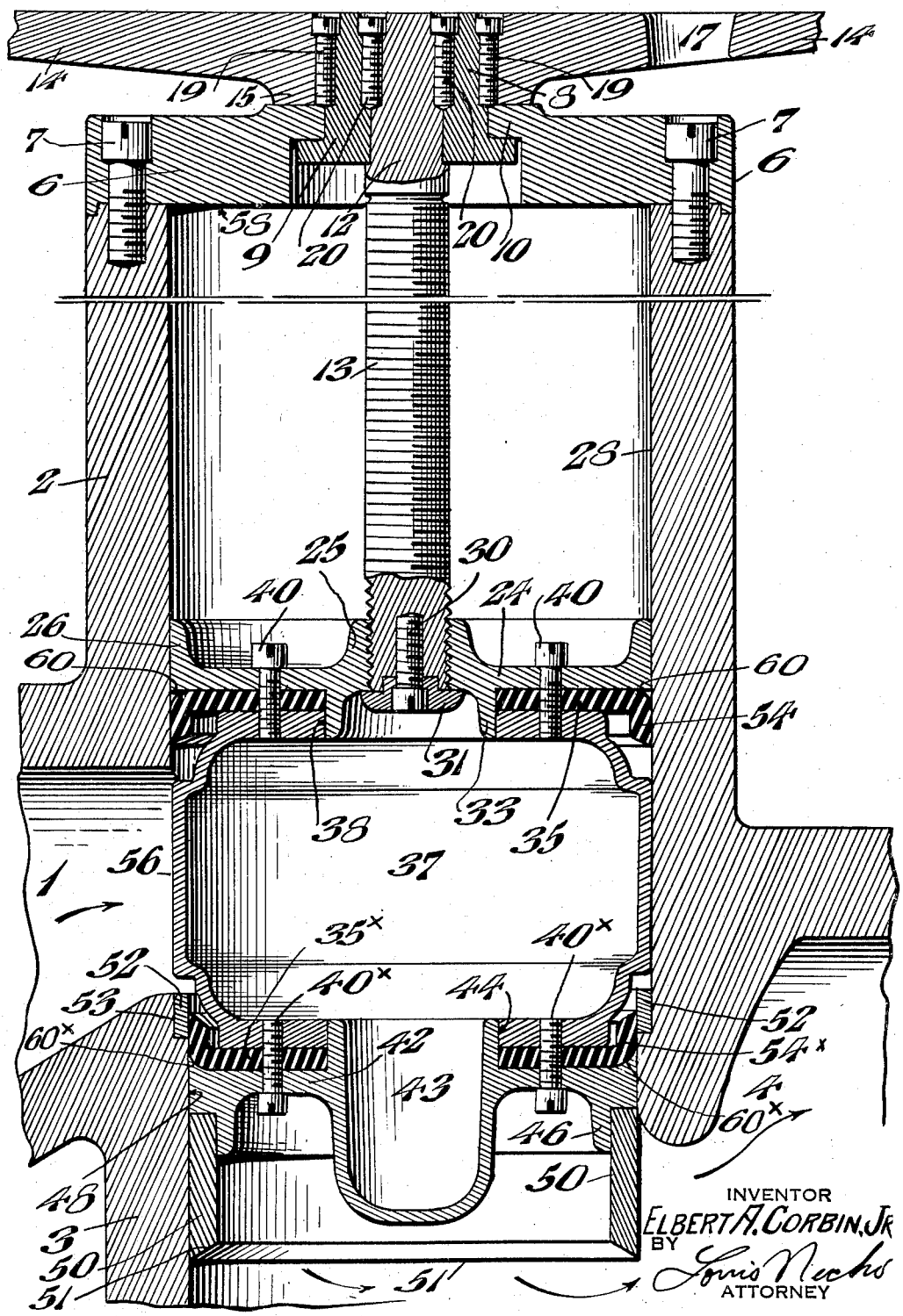
INVENTOR
Elbert A. Corbin, Jr.
BY
Louis Necho
ATTORNEY Patented Aug. 16, 1938

2,126,739

UNITED STATES PATENT OFFICE 2,126,739

VALVE

Elbert A. Corbin, Jr., Philadelphia, Pa., assignor of one-half to William C. Biddle, Lansdowne, Pa.

Application March 30, 1937, Serial No. 133,789

3 Claims. (Cl. 251—77)

My invention relates to a new and useful valve and it relates more particularly to a balanced valve in which no springs are used and in which the pressure of the fluid controlled by said valve serves to maintain the latter in closing position without the aid of extraneous means, and in which the pressure of the fluid serves to tighten the valve against leaking in contradistinction with other types of valves which gradually develop leaks as the gaskets forming part of such valves become compressed or distorted after being used for some time.

My invention further relates to a valve of this character which is especially adapted for use as a blow-out valve for boilers and the like in which great strength and retaining power are needed.

My invention further relates to a valve construction of this character in which the valve head is constructed on the valve stem to register with or clear the opening to be controlled while the valve stem itself, except for being rotatable on its axis, is otherwise stationary.

My invention further relates to a valve construction which can be readily applied to or withdrawn from the blow-out pipe of a boiler or the like without in any way interfering with the pipe construction assembly.

The exact construction and manner of operation of my novel valve will be more clearly understood from the following specification and the accompanying drawing in which:

The drawing represents a vertical sectional view of a valve construction embodying my invention.

Referring to the drawing in which like reference characters represent like parts, 1 designates the drain or blow-out pipe or connection of a boiler or the like (not shown) and which it is desired to control by my novel valve construction. The drain 1 is provided with the upper extension 2 which forms a valve casing and with the lower extension 3 which merges with or terminates in the pipe 4 leading to a point of disposal. The casing 2 is provided with a head 6 secured by the screws 7 or the like, the head 6 forming a bearing for the collar 8 which has the flange 9 abutting against the underside of the flange 10 of the head 6. Within the collar 8 is journaled the upper end 12 of the threaded stem 13. 14 designates a conventional hand wheel which has the bottom flange 15 bearing upon the upper surface of the flange 10 and which is provided with the opening 17 through which access may be had to the screws or fastening devices 7. The collar 8 is interlocked with the wheel 14 by one or more screws 19 and the collar 8 is interlocked with the valve stem 12 by one or more screws 20. 24 represents an annular plate having the threaded hub 25 engaging the threaded stem 13 and the vertical flange 26 adapted to fit snugly within and slide against the inner wall 28 of the casing 2. The hub 25 is further retained on the stem 13 by the screw 30, the head 31 of which abuts against the bottom of the hub 25 as shown. Surrounding the opening through which the head 31 of the screw 30 is inserted is a pendant flange 33 which forms an abutment for the gasket 35. 37 designates a casing which has an opening 38 in the top thereof through which the annular vertical flange 33 is inserted, the casing 37, the plate 24 and the washer 35 being tightly clamped together by the screws 40. 42 designates a bottom plate which is provided with the well 43, the upper rim of which engages the opening 44 in the bottom of the casing 37. The bottom pendant flange 46 is recessed somewhat from the inner wall 48 of the lower extension 3 and to it is suitably secured by any desired means the annular knife blade or cutter 50 having the cutting edge 51. 52 designates a shearing ring seated in the recess 53 in the lower extension 3. A gasket 35x is clamped between the bottom plate 42 and the bottom of the casing 37 by suitable means 40x. The gaskets 35 and 35x are provided with the flanges 54 and 54x which slidably abut against the inner walls 28 and 48 of the casings 2 and 3 respectively, which valve is in closing position.

The operation is as follows:

When the handle wheel 14 is turned, it turns the valve stem 13 which, being fixed against vertical movements, results in forcing the casing 37, the plate 24 and plate 42 and their adjuncts to move up or down on the valve stem 13 according to the direction of the rotation of the wheel 14. As shown in the drawing, the valve is in its closing position in which the outlet 1 is completely blocked. In this position the pressure of the fluid from the outlet 1 is dissipated against the face of the casing 37 and the pressure of the fluid bearing against the flanges 54 and 54x serves to force them more tightly against the walls 28 and 48 so that, the greater the pressure, the tighter the fit of the valve. When it is desired to open the outlet 1, the hand wheel 14 is turned to the left thus raising the valve construction upwardly until it completely or partly clears the opening 1 as desired. The straight, vertical edge 56 of the casing 37 serves completely to occupy and close the opening 28 to prevent any dirt entering thereinto while the valve is in its uppermost position. The upper edge of the flange 26 abuts against the under surface 58 of the head 6 to limit the upward motion of the valve without strain or damage to the parts, and it will be understood that the well 43 is sufficiently deep to accommodate the bottom end of the valve stem 30 when the valve construction is in its uppermost position. The well 43 is filled with oil or some other lubricant which may also partly fill the casing 37 so that, every time the valve structure is raised into the opening position, the lower end of the valve stem 13 will be automatically dipped in the lubricant, which not only lubricates the stem itself but which keeps all adjacent and adjunct parts adequately greased. I have not shown the lubricant in the well 43 or the casing 37 since it is obvious to anyone that the lubricant is inserted before the screw 30 is engaged with the stem 13, and that, if the casing 37 is about half filled, the device will work satisfactorily. Due to the forming of slag and scale inside of a boiler it is possible that when a boiler is blown out a relatively large piece of slag or scale may project partly from the outlet 1 but may not be blown out completely through the waste 4 and hence I provide the shearing element 50 which, on its downward motion while the valve is being lowered from its uppermost to its lowermost position, serves to cut off any obstructions in the path of the valve. If it is desired to dismantle the valve, the hand wheel 14 is turned until the opening 17 registers first with one and then the other of the screws 7 and after the latter have been disengaged, the head 6, the stem 13 and the entire valve construction down to the cutter 50 can be removed as a unit through the top of the extension casing 2. It will be noted that the gasket 54 has a square edge 60 and that the gasket 54x is provided with the round edge 60x so that the lower gasket 54x will clear the upper edge of the shearing ring 52 without being damaged.

Having thus described my invention, what I claim as new and desire to secure by Letters Patent is:

1. In a device of the character stated, a casing communicating at one end thereof with a boiler outlet, a threaded valve stem journaled in one end of said casing, means for rotating said valve stem, and a valve element threadedly engaging said stem and movable within said casing to register with or clear said outlet comprising, an upper plate threadedly engaging said stem and having an annular flange abutting against the wall of said casing, a flexible gasket abutting against said plate and having an annular flange abutting against the wall of said casing, a shell adapted to contain a lubricant and having an opening in the top edge thereof through which said valve stem projects when said valve is not in registration with said outlet, means for securing said plate, said washer, and the top of said shell together, a bottom plate circumferentially abutting against the wall of said casing, a flexible gasket positioned on said plate and having a flange abutting against the wall of said casing, a well formed substantially centrally of said lower plate and communicating with the interior of said shell through an opening in the bottom wall of said shell, and means for securing said bottom plate, said gasket and the bottom edge of said shell together.

2. In a device of the character stated, a casing communicating at one end thereof with a boiler outlet, a threaded valve stem journaled in one end of said casing, means for rotating said valve stem, and a valve element threadedly engaging said stem and movable within said casing to register with or clear said outlet comprising, an upper plate threadedly engaging said stem and having an annular flange abutting against the wall of said casing, a flexible gasket abutting against said plate and having an annular flange abutting against a wall of said casing, a shell adapted to contain a lubricant and having an opening in the top edge thereof through which said valve stem projects when said valve is not in registration with said outlet, means for securing said plate, said gasket and the top of said shell together, a bottom plate circumferentially abutting against the wall of said casing, a flexible gasket positioned on said plate and having a flange abutting against the wall of said casing, a well formed substantially centrally of said lower plate and communicating with the interior of said shell through an opening in the bottom wall of said shell, and means for securing said bottom plate, said gasket and the bottom edge of said shell together, said shell having a cylindrical portion adapted for wiping action with the wall of said casing.

3. In a device of the character stated, a casing communicating at one end thereof with a boiler outlet, a threaded valve stem journaled in one end of said casing, means for rotating said valve stem, a valve element threadedly engaging said stem and movable within said casing to register with or clear said outlet comprising, a plate threadedly engaging said stem and having an annular flange abutting against the wall of said casing, a flexible gasket abutting against said plate and having an annular flange abutting against a wall of said casing, a shell adapted to contain a lubricant and having an opening in the top edge thereof through which said valve stem projects when said valve is not in registration with said outlet, means for securing said plate, said washer and the top of said shell together, a bottom plate circumferentially abutting against the wall of said casing, a flexible gasket positioned on said plate and having a flange abutting against the wall of said casing, a well formed substantially centrally of said lower plate and communicating with the interior of said shell through an opening in the bottom wall of said shell, means for securing said bottom plate, said gasket and the bottom edge of said shell together, a flange formed on the lower side of said bottom plate spaced from the wall of said casing, and a shearing element disposed between said flange and the wall of said casing.

ELBERT A. CORBIN, Jr.